United States Patent
Daun et al.

(10) Patent No.: US 12,472,586 B2
(45) Date of Patent: Nov. 18, 2025

(54) LASER-MADE MICROPERFORATIONS IN FILMS

(71) Applicant: PRECO, LLC, Somerset, WI (US)

(72) Inventors: Mark Daun, Hudson, WI (US); Matt Lackner, Prescott, WI (US); James Bucklew, Somerset, WI (US); Kurt Hatella, New Richmond, WI (US); Karl Weber, Stillwater, MN (US)

(73) Assignee: PRECO, LLC, Somerset, WI (US)

( * ) Notice: Subject to any disclaimer, the term of this patent is extended or adjusted under 35 U.S.C. 154(b) by 1489 days.

(21) Appl. No.: 16/354,623

(22) Filed: Mar. 15, 2019

(65) Prior Publication Data

US 2019/0283185 A1    Sep. 19, 2019

Related U.S. Application Data

(60) Provisional application No. 62/644,052, filed on Mar. 16, 2018.

(51) Int. Cl.
*B23K 26/384*    (2014.01)
*B23K 26/00*    (2014.01)
(Continued)

(52) U.S. Cl.
CPC ........ *B23K 26/384* (2015.10); *B23K 26/0006* (2013.01); *B23K 26/0622* (2015.10);
(Continued)

(58) Field of Classification Search
CPC .............. B23K 26/384; B23K 26/0006; B23K 26/0622; B23K 26/0665; B23K 26/0734;
(Continued)

(56) References Cited

U.S. PATENT DOCUMENTS 5,183,706 A    2/1993    Bekele
5,211,875 A    5/1993    Speer et al.
(Continued)

FOREIGN PATENT DOCUMENTS

EP    0549357 A1    6/1993
EP    3038821 A1    7/2016
(Continued)

OTHER PUBLICATIONS

Extended European Search Report issued for EP Patent Application Serial No. 19767986.3, dated Apr. 30, 2021.
(Continued)

*Primary Examiner* — George R Koch
*Assistant Examiner* — Christopher C Caillouet
(74) *Attorney, Agent, or Firm* — Westman, Champlin & Koehler, P.A.; Z. Peter Sawicki; Amanda M. Prose

(57) ABSTRACT

A laser system and method is used to micro-drill a web producing holes of approximately 85 μm or less. The laser system comprises a laser beam having a wavelength in the range of approximately 2 to 6 microns and the focal point of the laser beam being steered onto a surface of the moving web wherein the web is moving. The web is a film such as a flexible film or commercial packaging film. The laser beam wavelength and constant laser energy can be used to laser micro-drill the flexible film.

26 Claims, 1 Drawing Sheet

(51) Int. Cl.
*B23K 26/06* (2014.01)
*B23K 26/0622* (2014.01)
*B23K 26/073* (2006.01)
*B23K 26/08* (2014.01)
*B23K 26/082* (2014.01)
*B65B 61/02* (2006.01)

(52) U.S. Cl.
CPC ...... *B23K 26/0665* (2013.01); *B23K 26/0734* (2013.01); *B23K 26/0821* (2015.10); *B23K 26/0846* (2013.01); *B65B 61/02* (2013.01)

(58) Field of Classification Search
CPC ............ B23K 26/0821; B23K 26/0846; B23K 2103/42; B23K 26/382; B65B 61/02; B65B 25/041; B65B 31/00
See application file for complete search history.

(56) References Cited

U.S. PATENT DOCUMENTS

| | | | |
|---|---|---|---|
| 5,227,098 A | 7/1993 | Philby et al. | |
| 5,310,497 A | 5/1994 | Ve Speer et al. | |
| 5,346,644 A | 9/1994 | Speer et al. | |
| 5,350,622 A | 9/1994 | Speer et al. | |
| 5,399,289 A | 3/1995 | Speer et al. | |
| 5,425,896 A | 6/1995 | Speer et al. | |
| 5,498,364 A | 3/1996 | Speer et al. | |
| 5,529,833 A | 6/1996 | Speer et al. | |
| 5,627,239 A | 5/1997 | Ching et al. | |
| 5,648,020 A | 7/1997 | Speer et al. | |
| 5,700,554 A | 12/1997 | Speer et al. | |
| 5,736,616 A | 4/1998 | Ching et al. | |
| 5,741,385 A | 4/1998 | Weinberg | |
| 5,773,107 A | 6/1998 | Weinberg | |
| 5,834,079 A | 11/1998 | Blinka et al. | |
| 5,859,145 A | 1/1999 | Ching et al. | |
| 5,896,994 A | 4/1999 | Krebs | |
| 5,904,960 A | 5/1999 | Becraft et al. | |
| 5,911,910 A | 6/1999 | Becraft et al. | |
| 5,981,676 A | 11/1999 | Gauthier et al. | |
| 6,032,800 A | 3/2000 | Kocher | |
| 6,044,622 A | 4/2000 | Brady et al. | |
| 6,143,197 A | 11/2000 | Gauthier et al. | |
| 6,150,011 A | 11/2000 | Bax et al. | |
| 6,172,331 B1 | 1/2001 | Chen | |
| 6,177,648 B1 | 1/2001 | Lawson et al. | |
| 6,214,254 B1 | 4/2001 | Gauthier et al. | |
| 6,233,907 B1 | 5/2001 | Cook, Jr. et al. | |
| 6,254,802 B1 | 7/2001 | Speer et al. | |
| 6,254,803 B1 | 7/2001 | Matthews et al. | |
| 6,254,804 B1 | 7/2001 | Matthews et al. | |
| 6,255,248 B1 | 7/2001 | Bansleben et al. | |
| 6,259,107 B1 | 7/2001 | Becraft et al. | |
| 6,279,738 B1 | 8/2001 | Mungo et al. | |
| 6,287,481 B1 | 9/2001 | Luthra et al. | |
| 6,365,245 B2 | 4/2002 | Blinka et al. | |
| 6,391,403 B1 | 5/2002 | Blinka et al. | |
| 6,441,340 B1 * | 8/2002 | Varriano-Marston | ....................... B65B 25/041 219/121.7 |
| 6,458,438 B2 | 10/2002 | Blinka et al. | |
| 6,464,896 B1 | 10/2002 | Speer et al. | |
| 6,476,137 B1 | 11/2002 | Longo | |
| 6,525,123 B1 | 2/2003 | Yang et al. | |
| 6,599,487 B1 | 7/2003 | Luthra et al. | |
| 6,610,215 B1 | 8/2003 | Cai et al. | |
| 6,632,408 B1 | 10/2003 | Luthra et al. | |
| 6,657,159 B2 | 12/2003 | McKee et al. | |
| 6,664,320 B1 | 12/2003 | Cai et al. | |
| 6,670,023 B2 | 12/2003 | Mueller | |
| 6,686,006 B1 | 2/2004 | Becraft et al. | |
| 6,689,438 B2 | 2/2004 | Kennedy et al. | |
| 6,730,874 B2 | 5/2004 | Varriano-Marston | |
| 6,746,622 B2 | 6/2004 | Yang et al. | |
| 6,818,150 B2 | 11/2004 | Galland et al. | |
| 6,864,459 B2 | 3/2005 | Chang et al. | |
| 6,872,451 B2 | 3/2005 | Ebner et al. | |
| 6,906,146 B2 | 6/2005 | Ching et al. | |
| 6,908,652 B1 | 6/2005 | Miranda et al. | |
| 6,942,821 B2 | 9/2005 | Dayrit et al. | |
| 6,946,175 B2 | 9/2005 | Yang et al. | |
| 7,078,100 B2 | 7/2006 | Ebner et al. | |
| 7,083,837 B1 | 8/2006 | Varriano-Marston | |
| 7,097,890 B1 | 8/2006 | Ching et al. | |
| 7,153,891 B2 | 12/2006 | Speer | |
| 7,186,464 B2 | 3/2007 | Laplante et al. | |
| 7,193,175 B1 | 3/2007 | Chang et al. | |
| 7,219,362 B2 | 5/2007 | Beckwith et al. | |
| 7,247,390 B1 | 7/2007 | Yang et al. | |
| 7,318,524 B2 | 1/2008 | Compton et al. | |
| 7,368,153 B2 | 5/2008 | Barmore et al. | |
| 7,452,601 B2 | 11/2008 | Ebner et al. | |
| 7,468,144 B2 | 12/2008 | Galland et al. | |
| 7,494,605 B2 | 2/2009 | Dayrit et al. | |
| 7,534,615 B2 | 5/2009 | Havens | |
| 7,569,395 B2 | 8/2009 | Havens et al. | |
| 7,749,768 B2 | 7/2010 | Havens et al. | |
| 7,754,798 B2 | 7/2010 | Ebner et al. | |
| 7,794,804 B2 | 9/2010 | Jerdee et al. | |
| 7,807,111 B2 | 10/2010 | Speer et al. | |
| 8,026,493 B2 | 9/2011 | Grossman et al. | |
| 8,080,212 B2 | 12/2011 | Speer et al. | |
| 8,357,414 B2 | 1/2013 | Becraft | |
| 8,697,160 B2 | 4/2014 | Becraft et al. | |
| 8,815,360 B2 | 8/2014 | Beckwith et al. | |
| 9,108,755 B2 | 8/2015 | Owensby et al. | |
| 9,452,592 B2 | 9/2016 | Beckwith et al. | |
| 2013/0075373 A1 | 3/2013 | Chang et al. | |
| 2017/0174852 A1 * | 6/2017 | Hanschen | ............... B32B 3/266 |

FOREIGN PATENT DOCUMENTS

| | | |
|---|---|---|
| FR | 2873992 A1 | 2/2006 |
| WO | 2011/151245 A1 | 12/2011 |
| WO | 2015/031467 A1 | 3/2015 |

OTHER PUBLICATIONS

Search Report issued for International Patent Application No. PCT/US 2019/022517 dated Jul. 4, 2019.
Written Opinion of the International Searching Authority issued for International Patent Application No. PCT/US 2019/022517 dated Jul. 4, 2019.

* cited by examiner

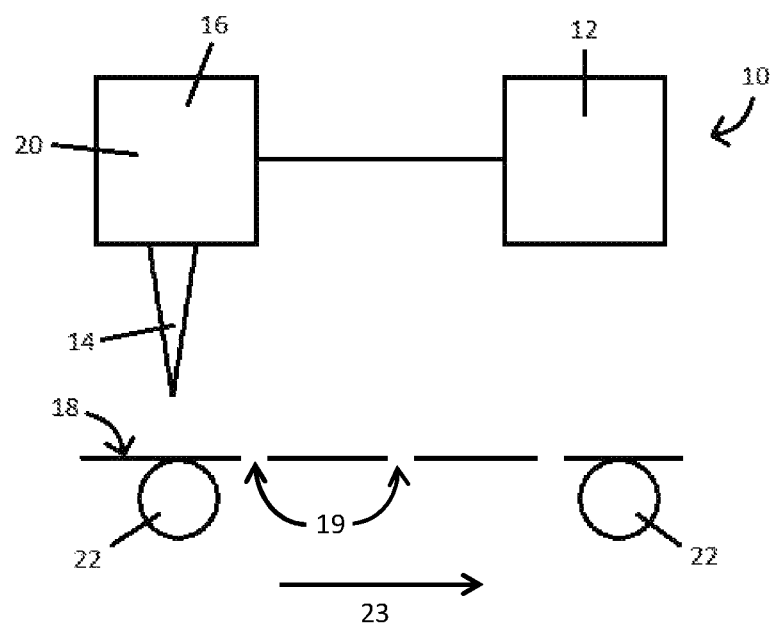

LASER-MADE MICROPERFORATIONS IN FILMS

BACKGROUND OF THE INVENTION

The present disclosure relates to a laser system for perforating a web of material. More specifically, the present disclosure relates to a laser system for and a method of producing laser micro-perforations in commercial packaging films at cost effective speeds.

Laser systems are often employed to create spaced holes in a product material such as an advancing web of film. These systems are advantageous because of the high product advancement speed and laser hole resolution that can be achieved. Similarly configured systems are used to create holes in continuously fed sheets and in products advanced on a conveyor. However, there are particular hole size limitations based on the speed and/or laser beam used to create the holes. Laser systems of the prior art are limited to producing holes or perforations approximately 85 microns in diameter or larger at cost effective production speeds, in flexible films and commercial packaging films. Although hole sizes of 85 micron or less have been achieved, such hole sizes have not been achieved at cost effective speeds in a production environment.

The fresh cut produce market, and specifically the fresh cut lettuce market has tripled in volume since the middle 1980's. This equates to a 7% year over year growth. In the era of the 1980's, the majority of lettuce purchased was iceberg lettuce, which was sold to consumers as an entire head of lettuce wrapped in plastic film. Sales of iceberg lettuce heads are roughly half of what they were 20 years ago. The volume growth has been made up by fresh cut lettuce, packaged in individual bags, with the bags having specialized film that extends the shelf life of the produce.

One current method or technique of extending shelf life of fresh produce or minimally processed food products is the use of modified atmosphere packaging (MAP). In this preservation technique the composition of the air surrounding the food in the package is modified in order to extend the initial fresh state of the product. The shelf life of perishable products like meat, fish, fruits and vegetables can be prolonged with MAP since it slows the natural deterioration of the product. In the case of fruits and vegetables which are respiring products, the interaction of the packaging material with the product is important and so low barrier or so-called high permeability films are used. If the permeability (for water vapor, $O_2$, and $CO_2$) of the packaging film is adapted to the product's level of respiration, an equilibrium-modified atmosphere will be established in the package and the shelf life of the product will increase. There exist a number of methods to produce such an atmosphere within the package.

One current film for modified atmosphere packaging ("MAP") with regards to fresh cut lettuce is an oxygen scavenging film, the subject of numerous patents assigned to Cryovac, Inc of Duncan South Carolina, exemplary patents include U.S. Pat. Nos. 5,859,145; 5,736,616; 5,627,239; 6,664,320; 6,906,146; 6,946,175; 7,097,890; 7,186,464; and 7,247,390. Other patents assigned to Cryovac, Inc. describe packaging film having at least a portion of the package being permeable to let in oxygen to a meat product to produce a desired red color to the meat.

Perforated films are also used to create a MAP atmosphere. Such films are described in U.S. Pat. Nos. 6,441,340; 6,730,874; and 7,083,837.

Additional food products, such as pet food bags, utilize air evacuation methods (for example, paper or polymer based 25 lb. dog food bags), after the bag has been filled with product and sealed, the air that is left in the bag can escape. The air evacuation method allows bags to be stacked on a pallet while preventing "pillowing" of the bags with trapped air, preventing the bags from stacking. Current laser perforation techniques produce holes that are too large at commercial manufacturing speeds. The larger holes (e.g., 85 micron) allow for insect infestation. In areas where it stays warm year around, it is common for vendors to keep their large bags of pet food outside. Mites are small enough to enter the bags through 85 micron diameter holes and contaminate the product and in some instances may make the animal sick.

Current laser technologies that can produce holes smaller than 85 micron in diameter utilize picosecond or femtosecond lasers, 1 micron (infrared) lasers or ultraviolet wavelength range lasers to create these holes. The lasers are used to profile a hole in the material. These laser systems also utilize a power (energy per unit of time) at the surface of the material that is not capable of producing small holes at cost effective speeds.

A method of operating a laser perforation system that enables micro-perforation of a material without sacrificing material advancement speed (e.g., web speed) would be a significant improvement in the art.

SUMMARY OF THE INVENTION

An aspect of the present disclosure relates to a method of laser perforating a moving web using a laser system equipped with a laser operating in the wavelength range of approximately 2 to 6 microns and steering a focal point of the laser beam on the moving web in coordination with a web moving at a speed sufficient to produce holes in the moving web, the holes having a diameter less than approximately 85 µm. The moving web has a thickness of approximately 20 to 150 µm, whereby the laser is pulsed at a duration of approximately 1 µsec to 750 µsec producing holes having a diameter in the range of approximately 85 µm or less.

The moving web may be a film, examples of which include but are not limited to, flexible films and commercial packaging films.

Another aspect of the present disclosure relates to a method of perforating a commercial packaging film for a modified atmosphere packaging using a laser system. The method comprises directing a focal point of a laser beam of the laser system onto a surface of the film to form holes in the film, the holes having a diameter less than approximately 85 µm, while moving the film through the laser system wherein the film has a thickness of approximately 20 to 150 µm, whereby the laser is pulsed at a duration of approximately 1 µsec to 750 µsec producing holes having a diameter in the range of approximately 85 µm or less.

More specifically, the holes can have a diameter as small as approximately 35 µm.

Yet another aspect of the present disclosure relates to a method of laser perforating a commercial packaging film with a mid-infrared wavelength laser beam at constant laser energy while moving the commercial packaging film through a laser system at a commercial production speed to produce holes in the film using a single axis galvanometer scanhead for steering the laser beam to produce holes having a diameter less than approximately 85 µm.

Yet another aspect of the present disclosure is a method of laser perforating a moving web by providing a laser system for producing a laser beam having a wavelength in the range of approximately 2 microns to 10 microns and steering a focal point of the laser beam on a surface of the moving web concurrently with moving the web and producing one or more holes in the moving web wherein the hole or holes have a diameter in the range of approximately 85 μm or less; and moving the web at least approximately 200 feet per minute while producing the one or more holes.

In a further aspect, wherein the moving web moving at least 200 feet per minute is a flexible film.

In another aspect, wherein the hole or holes being produced at at least 200 feet per minute have a diameter in the range of approximately 35 μm to 85 μm.

In another aspect a method of perforating a film for use as a modified atmosphere packaging by using a laser system includes directing a focal point of a laser beam of the laser system onto a surface of the film to form one or more holes in the film, the one or more holes having a diameter less than approximately 85 μm while moving the film through the laser system at a speed approximately 200 feet per minute or greater.

In another aspect the laser beam has a wavelength in the range of approximately 2 μm to 10 μm.

DESCRIPTION OF THE DRAWINGS

FIG. 1 is a diagram of a laser system and web according to the present specification.

DETAILED DESCRIPTION

If everything is stationary, generally speaking the diameter of the hole created is directly related to the diameter of the focused spot of the laser and how well the material reacts to the wavelength of the laser. The simple lens equation to calculate the diameter of the focused spot $$FS_D = \frac{4(\text{Beam Quality}) \times \lambda \times O_{FL}}{\pi \times RB_D}$$

Where $FS_D$ is the diameter of the focused spot;
4 (Beam Quality) is the geometry of the Gaussian representation in 4 standard deviations of the laser beam (Beam quality is sometimes referred to as $M^2$);
$\lambda$ is the wavelength of the laser beam;
$O_{FL}$ is the focal length of optic;
$\pi$ is Pi; and
$RB_D$ is the diameter of the raw or source laser beam.

From this equation, as the wavelength gets longer, the diameter of the focused spot gets larger and as the wavelength gets shorter, the diameter of the focused spot gets smaller. Many prior art applications utilize a $CO_2$ laser for packaging industry applications producing a laser beam of 9.36, 10.6 or 10.2 μm wavelength. Using the shortest practical lens with a $CO_2$ laser generates a focused spot size diameter of about 75 microns and which will produce the smallest hole of about 85 microns. To make larger holes a longer focal length lens can be used or commonly the beam is defocused. There is a limit on how long of a focal length can be practical and how far out of focus is reasonable to defocus the spot size.

Prior to this disclosure, the industrially available lasers were the $CO_2$ family (10.6, 10.2. and 9.36 μm) as discussed previously, the 1 micron laser family (1030-1090 μm), the 1 micron frequency doubled laser family (0.515-0.545 μm) and the 1 micron frequency tripled laser family (0.343-0.363 μm). The 1 μm laser family will produce about a 10 times smaller focused spot than the $CO_2$ laser family. The 1 micron frequency doubled family is about 20 times smaller and the 1 micron frequency tripled is about 30 times smaller. The problem is that the normal 1 micron, frequency double or tripled wavelength does not absorb/couple well with the packaging materials.

There are lasers that are in the pico and femto second family of pulse width that the material interaction with these lasers can be acceptable to the process of making a hole, but the size of the focused spot is much too small to make a sized hole between 35 and 85 microns. If the beam was defocused, to the point of achieving a diameter within this range, the interaction with the material no longer couples well. Thus to make a hole with pico and femto second lasers, the laser beam must profile a hole to get the desired hole diameter. Profiling a hole to produce the hole results in a removal rate too slow for a method to produce a hole at a cost effective rate for the packaging industry where throughput of packaging material is critical to packaging cost.

The CO laser (carbon monoxide) has a laser wavelength approximately 5 microns or about half of the $CO_2$ (carbon dioxide) laser wavelength. Using the CO laser holes between 35 and 85 microns are produced without the need for profiling or contouring, instead holes within the 35 and 85 micron range are produced on a repeatable basis by using the diameter of the focused spot.

The laser system of this disclosure is configured to laser score, contour score, and/or perforate various films for consumer and industrial applications. The laser system and method described herein produces a hole in the film by pointing, tracking, and shooting a target area with the laser beam. The method eliminates the need for contouring the holes for formation of the holes. Instead the holes are formed by "drilling" the holes using a point and shoot method that is faster than prior art contouring methods. "Laser drilling" is a phrase that has been used to describe prior art methods of creating holes. For purposes of this patent application the phrase "micro-laser drilling" is used to describe a process in which the holes being created are essentially the same diameter as the focused spot creating the holes. This phrase is introduced herein to distinguish over the prior art reference to "drilling" holes. Holes created by prior art methods (sometimes referred to as contour drilling) are generally much larger in diameter than the diameter of the focused beam creating the hole. Another aspect of the process of this disclosure is that a constant energy laser beam is used to micro-drill the holes. Using constant energy helps in repeatability in creating the substantially same size hole while the web is moving.

The moving film or web creates another issue for producing a substantially round hole. The term round hole is a term of art and is sometimes loosely defined, but as used in this disclosure, "round hole" refers to a substantially circumferential shape and in all instances it is not the shape of a slot. In a typical situation, the amount of time the laser beam is on will create a slot instead of a round hole when the film or web is moving. To produce a substantially round hole, the laser beam is synchronized with the moving web or film such that the laser spot is stationary in relation to the target area since the laser spot moves with the speed of the web or film thereby producing a substantially round hole. The synchronization of speed may be accomplished by a single axis galvanometer scanhead system which is described in U.S. Pat. No. 6,177,648 which is hereby incorporated in its entirety.

Holes smaller than 85 microns can be created with a $CO_2$ laser, but the process of making such holes with a $CO_2$ laser are not very capable or repeatable processes. An analogy can be made to the use of a conventional drill bit. With a ¼" drill bit it is easy to make ¼" diameter holes. A ¼" drill bit is designed to that; however a ¼" drill bit if carefully used can create a ⅛" hole. You need to stop drilling at the perfect depth that the tapered point breaks through and leaves a ⅛" hole. This is not a robust or repeatable process, but it can be done. If you want a ⅛" hole, it is best to use a ⅛" drill bit. Similarly a $CO_2$ laser can make holes smaller than 85 microns, but it is not very repeatable for similar reasons.

An $M^2$ of 1 is the theoretical perfect beam quality and higher numbers indicate a decreasing beam quality. Using the spot size equation, best beam quality gives the smallest available spot size for the particular wavelength. The laser system of this disclosure incorporates a mid-infrared wavelength laser and scanning technology such as described in U.S. Pat. No. 6,177,648 supported over a moving web. The use of the term "galvo" or "galvanometer" refers to a scanner which in its simple form includes a mirror attached to the end of a shaft which in turn is moved by a motor which when controlled steers a laser beam by way of the mirror to a selected position whether it be to a work piece or to another "galvo". The use of the terms "galvo", galvanometer" or "scanner" may be used interchangeably herein. Although the embodiments described herein refer to a 5 micron wavelength laser, additional and alternative laser wavelengths are also contemplated for scoring and perforating materials according to this disclosure. For example, a fiber laser having a wave length of approximately 2 to 3 microns may also be sufficient to produce the perforations in a moving web as described herein. A possibly suitable fiber laser is made by IPG Photonics of Oxford, Massachusetts.

Referring to the drawings, a laser system 10 is configured for moving a focused laser beam spot at a point where it impinges on the advancing web or film (product) in the same direction as the product is moving. The laser system 10 comprises a laser source 12 which generates a laser beam 14 that is focused by a lens 16 and reflected onto an advancing web 18. The web 18 is carried by rollers 22 or a similar advancement mechanism known in the art, moving in the direction indicated by arrow 23. The laser beam 14 is steered such that the focal point of the laser beam 14 moves linearly on the web 18 and produces holes 19 in the web 18 at the spot where the focal point (also referred to herein as the focused spot or laser spot) impinges on the web 18. The laser beam may be steered by a galvanometer scanhead (also referred to as a "galvo") 20. The speed of movement of the focal point of the laser beam 14 can be selected based on the laser power, the speed of advancement of the web 18, and the selected size and/or shape of the laser processed holes to be produced. The focal point of the laser beam or laser spot size is selected to produce holes 19 of a selected diameter and the focal point or laser spot is directed onto a surface of the web 18.

The term "hole" as used throughout this disclosure refers to scoring or perforating the material, regardless of the depth of the score or perforation, including through-holes. The score or perforation diameter size is modified by using different collimator lens options or different focusing lenses. The laser beam 14 is focused to produce the laser spot that is directed to the web such that when the laser spot impinges on the web, the hole of the selected diameter is produced.

The laser system 10 is configured to laser perforate the web 18. What is meant by the term "web" as used herein is a material or product for laser processing, examples of which include but are not limited to commercial packaging ready for its end-use such as those packaging materials comprising flexible films such as polymer films or constructions of polymer films. For example, the film may be a polyester, polypropylene, polyethylene, PTFE or polymer coextruded film or combinations of thereof and other polymers that typically constitute multi-layered films. The material or product may be provided on a roll for continuous processing or otherwise provided in sheets.

The laser system 10 utilizes a laser source 12 operating at a wavelength in the mid-infrared range in combination with web speed sufficient for commercial processing speeds that can produce micro-perforations in the web along a selected pattern. The laser source 12 may be a CO laser having a wavelength in approximately the 5 micron range. The laser source 12 may alternatively be a frequency doubled $CO_2$ laser which can generate a 5 micron laser beam. More generally, the wavelength may be in the range of approximately 4-6 micron. As described herein, the laser system 10 and a method of micro-perforating a packaging material utilizes an approximately 5 micron wavelength laser 12.

The commercial processing speed (e.g., web speed) at which the web 18 advances through the laser system 10 as described herein is preferably at least about 200 feet per minute (fpm) or more for micro-drilling the material with the mid-infrared laser wavelength for producing holes in the web 18 that have a diameter in the range of about 25 μm or less to about 95 μm, and more specifically in the range of 35 μm to 85 μm as selected based on the end use of the material or the selected application. However, slower processing speeds are equally contemplated.

The laser system 10 may be configured with a galvo that allows for micro-perforating the material with the mid-infrared laser wavelength for producing holes in the web 18 that have a diameter in the range of about 25 μm to about 95 μm, or more specifically in the range of about 35 μm to 85 μm at a web speed of up to about 2,500 fpm. Depending on the material thickness, laser power, and hole density, the web speed can range up to 2500 fpm for micro-perforating the holes 19. It should be understood that perforations are typically approximately the same size for any one application and that the ranges being given are sizes that can be selected and produced under this disclosure as needed for discrete applications.

While there are numerous applications for packaging construction that can benefit from laser perforated holes 19 as small as approximately 35 μm or even smaller, such as 25 μm or less in diameter, two examples are described further below to aid in the understanding of this disclosure.

EXAMPLE I

Fresh cut lettuce is generally sold in Modified Atmosphere Packaging ("MAP"). MAP is packaging comprised of flexible film that is effective in maintaining quality of the goods packaged therein through its effect on modification of the gas composition in the package. The packaging is configured with one or more holes to allow for gas transfer through the packaging as produce respires ($O_2$ uptake and $CO_2$ evolution of the packaged produce) to extend freshness of the packaged produce. Perforations in the film that are in the range of approximately 35 μm to 85 μm, and more specifically are closer to approximately 35 μm in diameter achieve increased shelf life of the packaged produce. The laser system 10 using an approximately 5 micron wavelength laser at a web speed of approximately 200 fpm produced one or more perforations approximately 35 μm in size in the film. The laser micro-perforation method described herein lowers the cost associated with producing a modified atmosphere package for lettuce.

EXAMPLE 2

The laser system 10 and method of perforating the web 18 described herein produced one or more holes having a diameter less than approximately 85 µm, for example as small as approximately 35 µm in diameter for use in packaging such as pet food packaging. The method of laser micro-perforation enables rapid filling, sealing, and stacking of pet food package.

Holes approximately 35 µm in diameter are large enough to allow for air evacuation when stacking filled and sealed bags, but small enough to prevent mite infestation at a consumer/user location.

The laser system 10 and method described herein can be used with a variety of materials and films as well as readily available packaging films while laser perforating the material with holes in approximately the 35 µm diameter range at production speeds in excess of about 200 feet per minute.

Although the present disclosure has been described with reference to preferred embodiments, workers skilled in the art will recognize that changes may be made in form and detail without departing from the spirit and scope of the disclosure.

What is claimed:

1. A method of micro-drilling a moving web comprising:
   providing a laser system for production of a laser beam having a wavelength in the range of 2 to 6 microns;
   steering a focal point of the laser beam on a surface of the moving web concurrently with moving the web and producing one or more round holes in the moving web wherein the moving web has a thickness of approximately 20 to 150 µm, whereby the laser is pulsed at a duration of 1 µsec to 750 µsec producing round holes having a diameter in the range of approximately 85 µm or less; and
   moving the web while producing holes.

2. The method of claim 1 wherein the round holes have a repeating circular configuration.

3. The method of claim 1 wherein the laser beam has a wavelength of 5 microns.

4. The method of claim 1 wherein the round hole or holes have a diameter in the range of approximately 25 µm to 95 µm.

5. The method of claim 1 wherein the round hole or holes have a diameter in the range of approximately 35 µm to 85 µm.

6. The method of claim 1 wherein the moving web is a flexible material comprising a polymer film.

7. A method of micro-drilling a film for use as a modified atmosphere packaging by using a laser system, the method comprising directing a focal point of a laser beam of the laser system onto a surface of the film to form round holes in the film, the round holes having a diameter less than approximately 85 µm while moving the film through the laser system wherein the moving film has a thickness of approximately 20 to 150 µm and whereby the laser is pulsed at a duration of 1 µsec to 750 µsec.

8. The method of claim 7 wherein the laser beam has a wavelength in the range of 2 to 6 microns.

9. The method of claim 8 wherein the round holes have a diameter in the range of approximately 35 µm to 85 µm.

10. The method of claim 7 wherein the laser beam has a wavelength of 5 microns.

11. The method of claim 7 wherein the diameter of the round holes is in the range of approximately 25 µm to 95 µm.

12. A method of micro-drilling a flexible film with a laser system, the method comprising directing a focal point of a laser beam produced by an 2 to 6 micron wavelength laser onto a surface of the film to form round holes in the film, the round holes having a diameter approximately less than 85 µm while moving the film through the laser system wherein the moving film has a thickness of approximately 20 to 150 µm, whereby the laser is pulsed at a duration of 1 µsec to 750 µsec and wherein the flexible material is then incorporated into pet food bags.

13. The method of claim 12 wherein the diameter of the round holes is in the range of approximately 25 µm to 95 µm.

14. The method of claim 12 wherein the round holes have a diameter in the range of approximately 35 µm to 85 µm.

15. The method of claim 12 where in the laser has a wavelength of 5 microns.

16. A method of laser perforating a commercial packaging film with a mid-infrared wavelength laser beam at a constant laser energy while moving the commercial packaging film through a laser system at a commercial production speed to micro-drill round holes in the film having a diameter less than approximately 85 µm.

17. The method of claim 16 wherein the wavelength of the laser beam is in the range of 4 to 10 microns.

18. The method of claim 17 wherein the wavelength of the laser beam is 5 microns.

19. The method of claim 16 wherein the diameter of at least a portion of the round holes is in the range of approximately 25 µm to approximately 95 µm.

20. The method of claim 16 wherein the diameter of at least a portion of the round holes is in the range of approximately 35 µm to approximately 85 µm.

21. The method of claim 16 and steering the laser beam with respect to the commercial packaging film moving through the laser system with a single axis galvanometer.

22. A method of laser perforating a moving web comprising:
   providing a laser system for production of a laser beam having a wavelength in the range of 2 microns to 6 microns;
   steering a focal point of the laser beam on a surface of the moving web concurrently with moving the web and producing one or more round holes in the moving web wherein the round hole or holes have a diameter in the range of approximately 85 µm or less; and
   moving the web at least approximately 200 feet per minute while producing the one or more round holes.

23. The method of claim 22 wherein the moving web is a flexible film.

24. The method of claim 22 wherein the round hole or holes have a diameter in the range of approximately 35 µm to 85 µm.

25. A method of perforating a film for use as a modified atmosphere packaging by using a laser system, the method comprising directing a focal point of a laser beam of the laser system onto a surface of the film to form one or more round holes in the film, the one or more round holes having a diameter less than approximately 85 µm while moving the film through the laser system at a speed approximately 200 feet per minute or greater.

26. The method of claim 25 wherein the laser beam has a wavelength in the range of 5 µm to 10 µm.

* * * * *